March 21, 1967  W. BAKER  3,309,802
DITCH FORMING AND CLEANING MECHANISM
Filed June 15, 1964  2 Sheets-Sheet 1
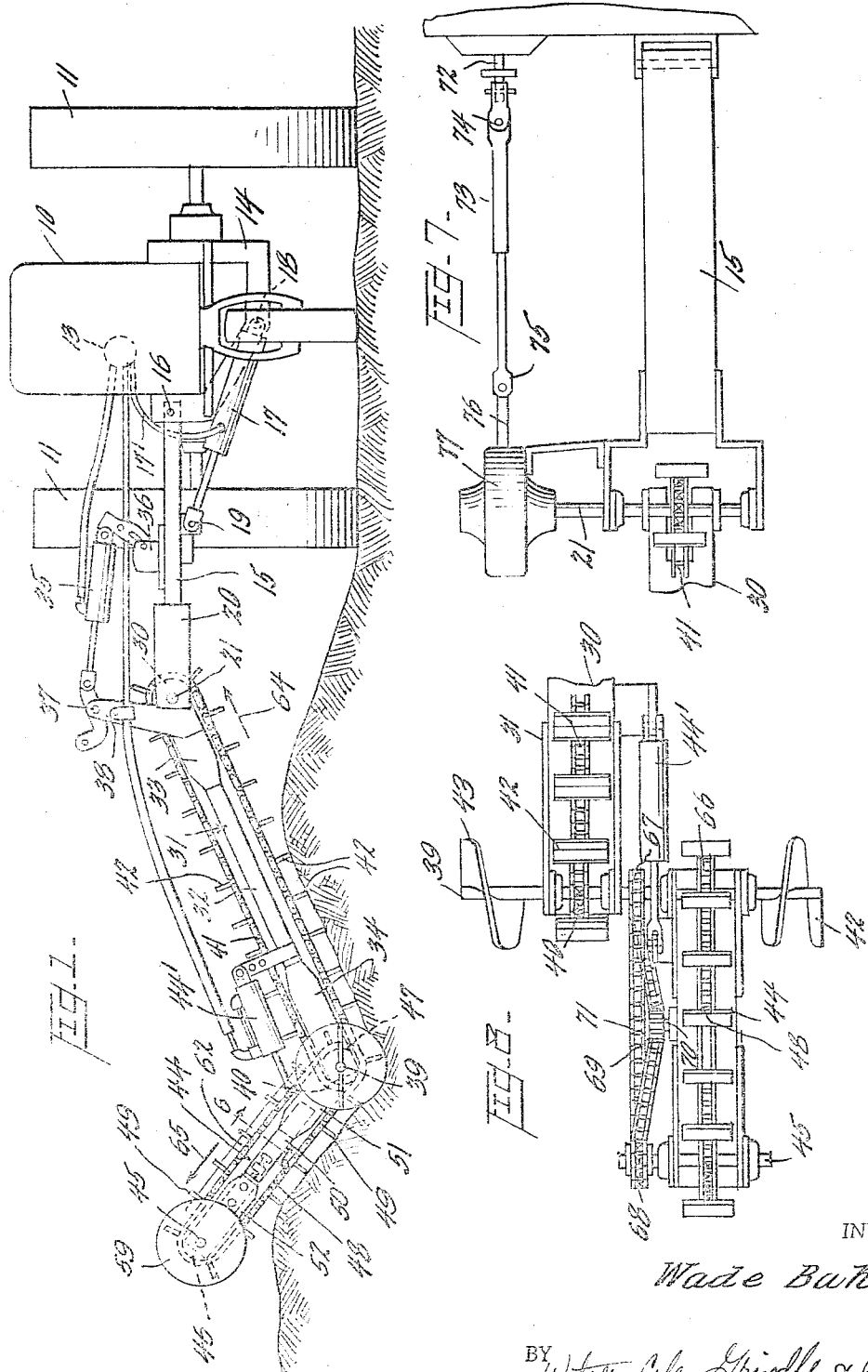
INVENTOR
Wade Baker,
BY Watson, Cole, Grindle & Watson
ATTORNEYs

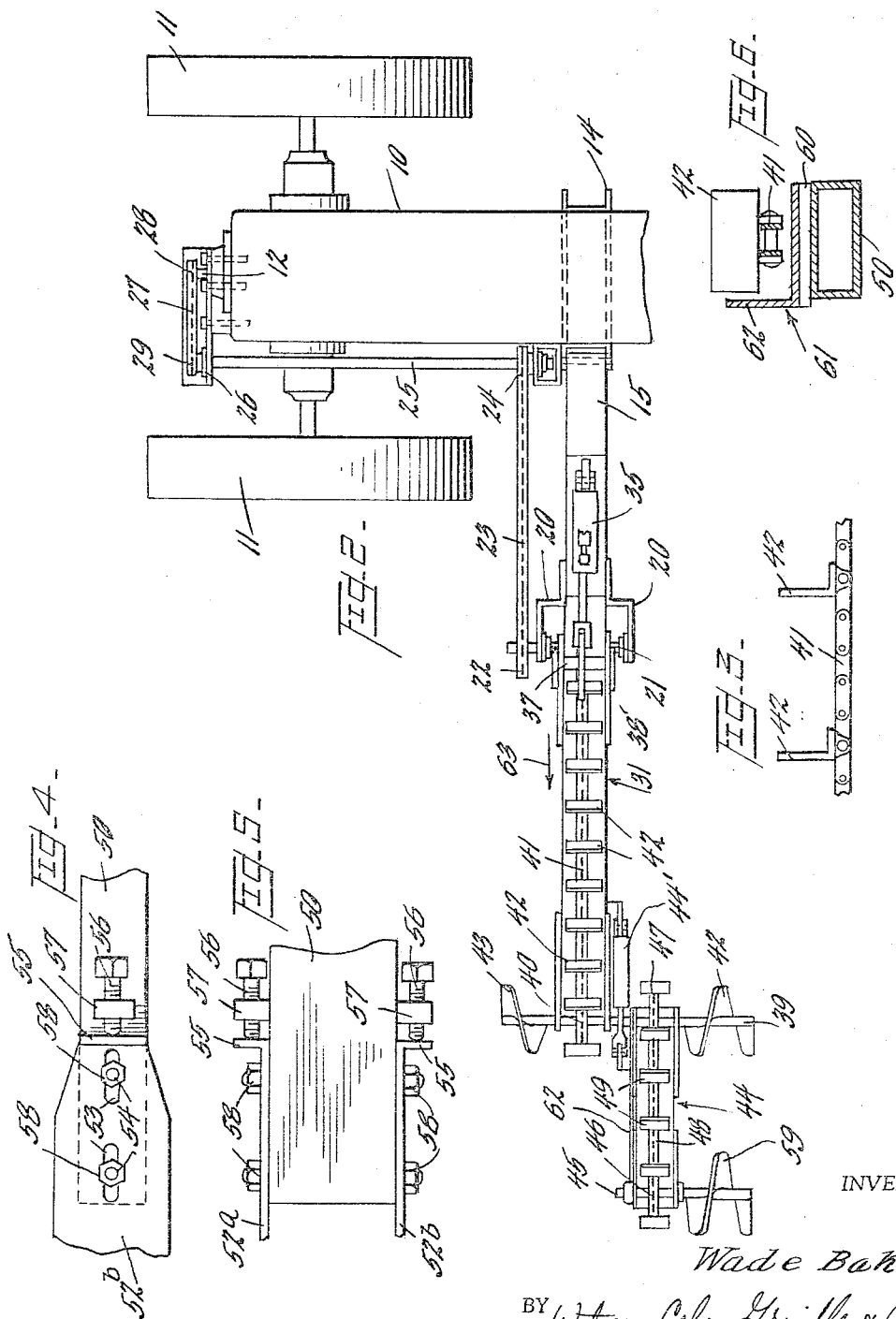

United States Patent Office 3,309,802
Patented Mar. 21, 1967

3,309,802
DITCH FORMING AND CLEANING MECHANISM
Wade Baker, Rte. 2, Burley, Idaho 83318
Filed June 15, 1964, Ser. No. 375,202
10 Claims. (Cl. 37—191)

This invention relates to machines for forming and cleaning ditches, for example, irrigation ditches and the like, and more particularly to an implement for attachment to a powered vehicle such as an agricultural or other tractor. So attached, the implement can be transported from place to place without dismounting, as well as operated and propelled during operation by means of the power take-off and the hydraulic system with which such tractors are normally provided.

The primary object of the invention is the provision of an implement of the class described which is capable of digging or forming ditches as well as cleaning existing ditches either while dry or while carrying a flow of water. These operations are carried out without damage to the ditch banks, head gates or any needed structures, the debris, weeds, aquatic growth or other unwanted material being removed from the ditch and deposited on the ditch banks. To this end it is an object of the invention to provide an implement comprising a boom or first elongated frame secured at one end to the tractor or other vehicle for angular movement about an axis parallel to the direction of travel of the vehicle, a second elongated frame having one end articulated to the other end of the said boom or first frame for relative angular movement of said second frame about an axis parallel to the first said axis, a sprocket mounted chain carried by said second frame and traveling in a plane normal to the said axes of angular movement, the chain being provided with transverse cleats extending outwardly thereof at right angles to the direction of travel of the chain, an auger or screw mounted at the other end of the second frame for rotation about an axis parallel to said other axes, means for producing angular movements of the said first and second frames about the said first and second axes, respectively, means for driving at least one of the chain sprockets, and means for rotating the auger to advance the distal end of the said assembly as the implement operates, thus preventing side-draft on the tractor or other vehicle as well as undue stresses on the elongated frames and their articulations.

Another object is the provision of an implement of the character described above, and including a third frame articulated to the outer end of the second frame and similarly provided with a cleated chain, together with means for producing angular movement of the third frame relative to the second frame, whereby both sides of a V-shaped ditch can be formed or cleaned simultaneously. In this form of the device the second chain can be operated in the same rotative sense as the first chain, in which case all of the material removed from the ditch can be deposited on the same bank or on opposite banks as later described; or it may be operated in the opposite rotative sense in which case the material removed from the respective sides of the ditch will be deposited on the respective banks.

The chain sprockets may be driven from the conventional rear power take-off of the tractor, through a countershaft mounted alongside the tractor, or alternatively may be driven from a power take-off shaft extending transversely from the engine of the tractor through a drive shaft and universal joints extending transversely of the tractor to a gear case carried on the outer end of the boom or first elongated frame.

If desired, an auger may be mounted at the outer end of the optional third elongated frame to assist in propelling the implement along the ditch.

Other and further objects, features and advantages will be apparent from the description which follows, read in connection with the accompanying drawings, in which:

FIGURE 1 is a front elevation of an agricultural tractor equipped with an implement according to the present invention;

FIGURE 2 is a plan view of the device illustrated in FIGURE 1;

FIGURE 3 is a detailed view showing a portion of the cleat-carrying chain;

FIGURE 4 is a fragmentary side elevation showing the chain tightening adjustment with which the second and third elongated frames are preferably provided;

FIGURE 5 is a fragmentary plan view corresponding to FIGURE 4;

FIGURE 6 is a transverse section on line 6—6 of FIGURE 1;

FIGURE 7 is a fragmentary plan view illustrating a modification of the drive means for the sprocket chain carried by the third elongated frame; and FIGURE 8 is a fragmentary plan view showing a further modification.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, the numeral 10 indicates a conventional agricultural tractor having drive wheels 11, a conventional power take-off shaft 12, and a conventional hydraulic system including a pump 13. A generally U-shaped mount or yoke 14 straddles the tractor engine from beneath and is bolted or otherwise suitably attached to the tractor frame. A boom or first elongated frame 15 is pivoted to the yoke 14 as at 16 (FIGURE 1) for angular movements about an axis extending substantially parallel to the direction of travel of the tractor 10. Such angular movements can be produced by means of a hydraulic jack 17 fastened between a pivot 18 at the base of the yoke 14 and a pivot 19 carried by the boom 15. Hydraulic fluid is conducted to the jack 17 through a conduit 17' from the hydraulic pump 13 of the tractor hydraulic system. The flow of hydraulic fluid to and from the jack 17 as well as to and from the other jacks hereinafter mentioned is preferably controlled by a manifold valve system of conventional construction, not illustrated. The boom 15 may be of box section or other suitable fabrication of sufficient strength and rigidity for the purpose, and is provided at its outer end with a fork formed by opposite offset arms 20.

A shaft 21 journaled in the arms 20 is provided adjacent one end with a sprocket wheel 22 to receive a chain 23 extending from a sprocket wheel 24 mounted on a countershaft 25 extending fore and aft of the tractor. The rearward end of the countershaft 25 is journaled in a bracket 26 bolted to the rear of the tractor. The countershaft 25 is driven through a chain 27 carried by sprocket wheels 28, secured to the power take-off shaft 12, and 29 secured to the rearward end of the countershaft 25.

A sprocket wheel 30 is mounted on the shaft 21 intermediate the arms 20. A second elongated frame 31 comprising an intermediate box section member 32 and bifurcated end sections 33 and 34 is pivoted on the shaft 21 for angular movement relative to the first elongated frame or boom 15. Such angular movements are produced through a hydraulic jack 35 pivoted to the boom 15 as at 36 and pinned at 37 to an upstanding lug 38 carried by the elongated frame 31. A shaft 39 is journaled in the outer bifurcated section 34 of the frame 31 and carries a sprocket wheel 40. A chain 41 surrounds, engages and extends between the sprocket wheels 30 and 40, the chain 41 being provided with a continuous series of upstanding cleats 42 bolted or otherwise suitably fastened to the chain at spaced intervals, as best seen in FIGURES 3 and 6. The sprocket wheel 30, being fast on the shaft 21, is driven as hereinbefore described and in turn drives the chain 41, sprocket wheel 40 and shaft 39. The latter carries a dirt auger 42 at its forward end, and a similar auger 43 at its rearward end, the pitch of the augers 42 and 43 and the direction of rotation of the shaft 39 being such as to advance the shaft 39, through engagement of the augers with the ground, at a rate comparable to movement of the tractor 10 over the ground, thus avoiding side-draft on the tractor and greatly minimizing the stresses which would otherwise be applicable to the frames 31 and 15 and their articulations. The auger 42 has an additional function which is detailed later.

A third elongated frame 44 is pivoted on the shaft 39, construction of the frame 44 being similar to that of the frame 31. A shaft 45 is journaled in the outer end of the frame 44 and carries a sprocket wheel 46. A similar sprocket wheel 47 is fast on the shaft 39 intermediate the sides of the frame 44 and a chain 48 carrying cleats 49 surrounds, engages and extends between the sprocket wheels 46 and 47. The chain 48 is, of course, driven by the shaft 39 which in turn is driven by the chain 41 from the shaft 21.

The frame 44, like the frame 31, preferably comprises an intermediate box section 50 and bifurcated end sections 51 and 52. The box section 50 has a telescoping engagement with one of the end sections 52 for purposes of adjusting the length of the frame 44 to secure proper tension in the chain 48. The adjustment is illustrated in FIGURES 4 and 5 wherein the plates 52a and 52b constituting the bifurcated end section 52 are seen to be provided with slots 53 to receive studs 54 extending laterally from the box section 50. A lateral flange 55 on the end of each plate 52a, 52b is engaged by an adjusting screw 56 threaded in a lug 57 secured on the box section 50, whereby the plates 52a and 52b may be urged outwardly against tension of the chain 48. When the proper tension is obtained, the adjustment is maintained by tightening nuts 58 on the studs 54. A similar adjusting mechanism is preferably included in the second elongated frame 31, but is not illustrated.

It is preferred to provide shaft 45 with an auger 59 similar to the auger 42, for advancing the outer end of the frame 44, thus relieving the bending stresses which otherwise would be placed upon the shaft 39 and the frame 44. The auger 59, of course, is driven by the shaft 45 which is in turn driven by the chain 48. The frame 44 is angularly adjustable relative to frame 31 by hydraulic jack 44′.

As best seen in FIGURE 6, the box section 50 of the frame 44 preferably carries, on supports 60, a dirt pan 61 of L-section which extends beneath the upper reach of the chain 48 for substantially the entire distance between the sprocket wheels 46 and 47, the upright flange 62 of the pan 61 being disposed rearwardly relative to the direction of the movement of the implement.

The operation of the devices is as follows. The direction of travel of the chain 41 carried by the second elongated frame is indicated by the arrow 63 in FIGURE 2 indicating the movement of the upper reach of the chain and the arrow 64 in FIGURE 1 indicating the movement of the lower reach of the chain. Material to be removed from the near side of the V-shaped ditch is dragged out by the cleats carried by the chain 41 and deposited on the near bank of the ditch. Due to the operative connections as hereinbefore described, the direction of travel of the chain 48 carried by the third elongated frame, is as indicated by the arrow 65 in FIGURE 1 and material on the far side of the ditch is dragged downwardly toward the center of the ditch. Here, it is carried upwardly and rearwardly by the auger 42 and deposited on the pan 61 beneath the upper reach of the chain 48. The travel of the chain 48 in the direction of the arrow 65 carries this material to the outer end of the implement and deposits it on top of the far bank of the ditch. However, if the pan 61 is omitted, this material will be engaged by the cleated chain 41 and dragged up the near side of the ditch.

If desired, the chain carried by the third elongated arm may be caused to travel in the opposite direction, thus dragging the material to be removed up the far side of the ditch. This modification is illustrated in FIGURE 8 wherein the sprocket wheel 47 of FIGURE 2 is replaced by an idler sprocket 66 journaled on the shaft 39. A sprocket wheel 67 is fast on the shaft 39 between the elongated frames 31 and 44 and a further sprocket wheel 68 is secured on shaft 45 in the plane of the sprocket wheel 67. An idler sprocket 69 is carried on a stud shaft 70 journaled on the frame 44. A chain 71 is reversed by having one of its reaches engage the bottom of the sprocket wheel 67, the idler sprocket 69 (for clearance), and the top of the sprocket wheel 68, thus rotating shaft 45 in a direction opposite to the rotation of the shaft 39. In this case no dirt pan 61 is needed or used since the opposite travel of the chain 48 causes the material to be dragged up the slope of the far bank by the cleats carried by the lower reach of the chain 48.

FIGURE 7 illustrates a suitable means for driving shaft 21 from a power take-off shaft 72 extending out of the side of the tractor engine, as is the case in some types of agricultural tractors. A telescoping drive shaft 73 provided with universal joints 74 and 75 operatively connects the power take-off shaft 72 and a stud shaft 76 extending from a gear case 77 containing suitable bevel gears for transmitting the motion of the drive shaft 73 to the shaft 21.

Having thus described the invention, what is claimed as new and desired to be secured by Letters Patent is:

1. A ditch digging and cleaning implement comprising a first elongated frame, means for securing an end of said frame to a powered vehicle for angular movements about a first axis substantially parallel to the direction of travel of said vehicle, a second elongated frame having an end articulated to the other end of said first frame for relative angular movements of said second frame about a second axis parallel to said first axis, sprockets journaled on said second frame adjacent the respective ends thereof for rotation in a common plane substantially normal to said second axis, a continuous chain surrounding, engaging and extending between said sprockets, a plurality of cleats attached crosswise of said chain at spaced intervals for engaging said ditch for the digging operation, each cleat extending outwardly substantially at right angles to the direction of said chain at the point of attachment of said cleat, an auger journaled on said second frame adjacent its other end for rotation about an axis parallel to said other axes, means for producing angular movements of said first and second frames about said first and second axes, respectively, means for driving at least one of said sprockets, and means for rotating said auger, said auger having a spiral body for engagement with said ditch to provide advancing movement along said ditch upon said rotation to assist the movement of said implement in said direction of travel.

2. An implement according to claim 1, including a third elongated frame having an end operatively connected to said other end of said second elongated frame for angular movements about an axis parallel to said auger axis, sprockets journaled on, and adjacent the ends of, said third frame, a cleated chain surrounding, engaging and extending between said last-mentioned sprockets, means for producing said angular movements of said third frame, and means for driving at least one of said last-mentioned sprockets.

3. An implement according to claim 2, including a second auger journaled on said third frame adjacent the other end thereof for rotation about an axis parallel to said first auger axis, and means for rotating said second auger.

4. A ditch digging and cleaning implement comprising a first elongated frame, means for securing an end of said frame to a powered vehicle for angular movements about a first axis substantially parallel to the direction of travel of said vehicle, a second elongated frame having an end articulated to the other end of said first frame for relative angular movements of said second frame about a second axis parallel to said first axis, sprockets journaled on said second frame adjacent the respective ends thereof for rotation in a common plane substantially normal to said second axis, a continuous chain surrounding, engaging and extending between said sprockets, a plurality of cleats attached crosswise of said chain at spaced intervals, each cleat extending outwardly substantially at right angles to the direction of said chain at the point of attachment of said cleat, a third elongated frame having an end operatively connected to the other end of said second frame for angular movements about a third axis parallel to said other axes, sprockets journaled on and adjacent the ends of said third frame, a cleated chain surrounding, engaging and extending between said last-mentioned sprockets, means for producing said angular movements of said respective frames, means for driving at least one sprocket of each said second and third frames and a pan extending between the ends of said third frame and underlying the upper reach of said last-mentioned cleated chain, said driving means being operative to drive said chains in the same rotative direction, whereby upon rotation of said cleated chain the material engaged by the lower reach of said chain is carried first toward said second frame along said ditch and then away from said second frame along said pan to deposit said material in a position remote from said second frame.

5. An implement according to claim 2, wherein is further provided a pan extending between the ends of said third frame and underlying the upper reach of the last-mentioned cleated chain, and said driving means for said sprockets being operative to drive said chains in the same rotative direction, whereby upon rotation of said last-mentioned cleated chain the material engaged by the lower reach of said chain is carried first toward said second frame along said ditch and then away from said second frame along said pan to deposit said material in a position remote from said second frame.

6. An implement according to claim 4 wherein is provided means on said implement adjacent said other end of said second frame for engagement with said ditch to provide advancing movement along said ditch to assist the movement of said implement in said direction of travel, said means being driven by said driving means along a second axis parallel to said first axis.

7. An implement according to claim 6 wherein said last-mentioned means comprises an auger having a spiral body mounted along said third axis and drive means for rotating said spiral body.

8. A ditch digging and cleaning implement comprising a first frame, means for securing said frame to a powered vehicle, a second elongated frame having an end articulated to said first frame for relative angular movement of said second frame about a first axis parallel to the direction of travel of said vehicle, means for producing said angular movement for adjustment of said second frame with respect to said ditch, a continuous conveyor mounted on said second frame for movement in an endless path extending in the direction of the longitudinal axis of said second frame, a plurality of outwardly extending cleats attached to said conveyor at spaced intervals for engaging said ditch for the digging and cleaning operation, means for driving said conveyor along said endless path to effect said operation, and means on said implement adjacent the other end of said second frame for engagement with said ditch to provide advancing movement along said ditch to assist the movement of said implement in said direction of travel, said means being driven by said driving means along a second axis parallel to said first axis.

9. An implement according to claim 8 wherein said last-mentioned means comprises an auger having a spiral body extending along a second axis parallel to said first axis and drive means for rotating said spiral body.

10. An implement according to claim 8 wherein is further provided a third elongated frame having an end articulated to said other end of said second frame for angular movements about said second axis and a second continuous conveyor mounted on said third frame for endless movement in the direction of the longitudinal axis of said third frame, a plurality of outwardly extending cleats attached to said second conveyor at spaced intervals for engaging said ditch for the digging and cleaning operation, and means for connecting said second conveyor to said first conveyor for rotation therewith.

References Cited by the Examiner

UNITED STATES PATENTS

| 1,175,926 | 3/1916 | Bunnell | 37—85 |
| 1,721,392 | 7/1929 | Heumann | 37—189 X |
| 1,869,446 | 8/1932 | Weikel | 37—85 X |
| 2,368,114 | 1/1945 | Cartlidge. | |
| 2,381,085 | 8/1945 | Snyder | 37—85 |
| 2,410,271 | 10/1946 | Davidson et al. | 37—85 X |

FOREIGN PATENTS

| 1,032,242 | 6/1953 | France. |
| 1,199,082 | 12/1959 | France. |

ANTONIO F. GUIDA, *Primary Examiner.*

ABRAHAM G. STONE, *Examiner.*

J. R. OAKS, *Assistant Examiner.*